March 13, 1956 A. J. RAE 2,738,193

RECORD CHANGING MECHANISMS FOR PHONOGRAPHS AND THE LIKE

Filed Sept. 17, 1951 2 Sheets-Sheet 1

Inventor
ALEXANDER JAMES RAE
By Ralph E. Atherton
Attorney

March 13, 1956 A. J. RAE 2,738,193

RECORD CHANGING MECHANISMS FOR PHONOGRAPHS AND THE LIKE

Filed Sept. 17, 1951 2 Sheets-Sheet 2

Inventor
ALEXANDER JAMES RAE
By Ralph E. Atherton
Attorney

United States Patent Office 2,738,193

Patented Mar. 13, 1956

2,738,193

RECORD CHANGING MECHANISMS FOR PHONOGRAPHS AND THE LIKE

Alexander James Rae, Norwood Green, Southall, England, assignor to Electric & Musical Industries Limited, Hayes, England, a company of Great Britain

Application September 17, 1951, Serial No. 246,900

Claims priority, application Great Britain September 30, 1950

2 Claims. (Cl. 274—10)

Figure 1:
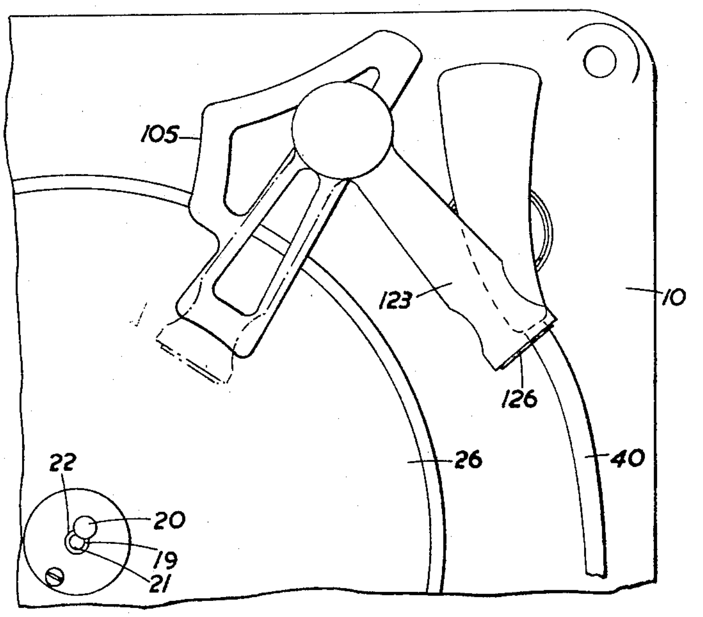

The present invention relates to record changing mechanisms, for phonographs, of the kind in which a pile of records is adapted to be supported above the turntable and in which means are provided for automatically releasing the records singly from the underside of the pile so that they descend onto the turntable and are played in succession by the reproducing means of the phonograph. It is particularly concerned with mechanisms of this kind in which a member is provided for steadying a pile of records placed on the mechanism.

A member for this purpose usually comprises an arm pivotally mounted for movement about either a horizontal axis or a vertical axis on the upper end of a pillar carried by the mechanism, such member being arranged to engage and steady the pile of records when in one position above the turntable and being adapted to be moved about its pivot to another position at the side of the turntable to permit records to be loaded onto and removed from the mechanism. The steadying member, during operation of the mechanism, descends by gravity with the topmost record as each record is released from the underside of the pile and when the topmost record becomes the last record and is released the steadying member undergoes a final downward movement. In order to remove the played records from the turntable and load a fresh batch of records onto the mechanism it is necessary to raise the steadying member and move it to a position where it will not obstruct these operations. Usually the steadying arm will be arranged to move upwardly and outwardly to a position at the side of the turntable for this purpose but it may be arranged to move in any suitable manner to any convenient position such that it will not obstruct the loading and unloading operations and such position will be referred to hereinafter as the away position of said member.

Phonographs associated with record changing mechanisms are usually provided with means for adapting the apparatus for manual operation. That is to say, means are provided for disabling the automatic mechanism so that records can be fed by hand to the turntable and the reproducer moved by hand onto the record as in the case of an ordinary phonograph. For record changing mechanisms of the kind to which the present invention refers it is usually desirable and sometimes essential for the record steadying member to be moved to the away position to enable records to be fed manually onto the turntable and it has been proposed hitherto to make use of the steadying member in its away position to cause the automatic mechanism of the record changer to be disabled and the apparatus to be set for manual operation.

An object of the present invention is to provide an improved arrangement of this kind in which use is made of the steadying member in its away position to disable only a portion of the automatic mechanism.

According to the invention a record changing mechanism, for phonographs, of the kind in which records are adapted to be supported in a pile above the turntable and to be released singly from the underside of the pile so that they descend onto the turntable and in which means are provided for raising and lowering the reproducer and for moving it outwardly and inwardly during automatic cycles of the mechanism initiated at the end of playing of each record, is provided with a member which is adapted in one position to engage and steady the pile of records and in another position away from the turntable to cause said mechanism to be ineffective to move the reproducer inwardly, the arrangement being such that when said member is in said other position the reproducer may be fed manually into engagement with a record on the turntable and raised and displaced outwardly by the automatic mechanism at the end of playing of said record.

When the steady member is moved to its away position records may be fed manually onto the turntable and the reproducer must be moved by hand into engagement with the record but if the operator permits the reproducer to reach the end of the sound track of the record the automatic mechanism will then operate to raise and move the reproducer outwardly and to lower the reproducer in its outward position and, preferably, this lowering movement in the outward position will be arranged to actuate means for bringing the apparatus to rest.

Figures 2, 3:
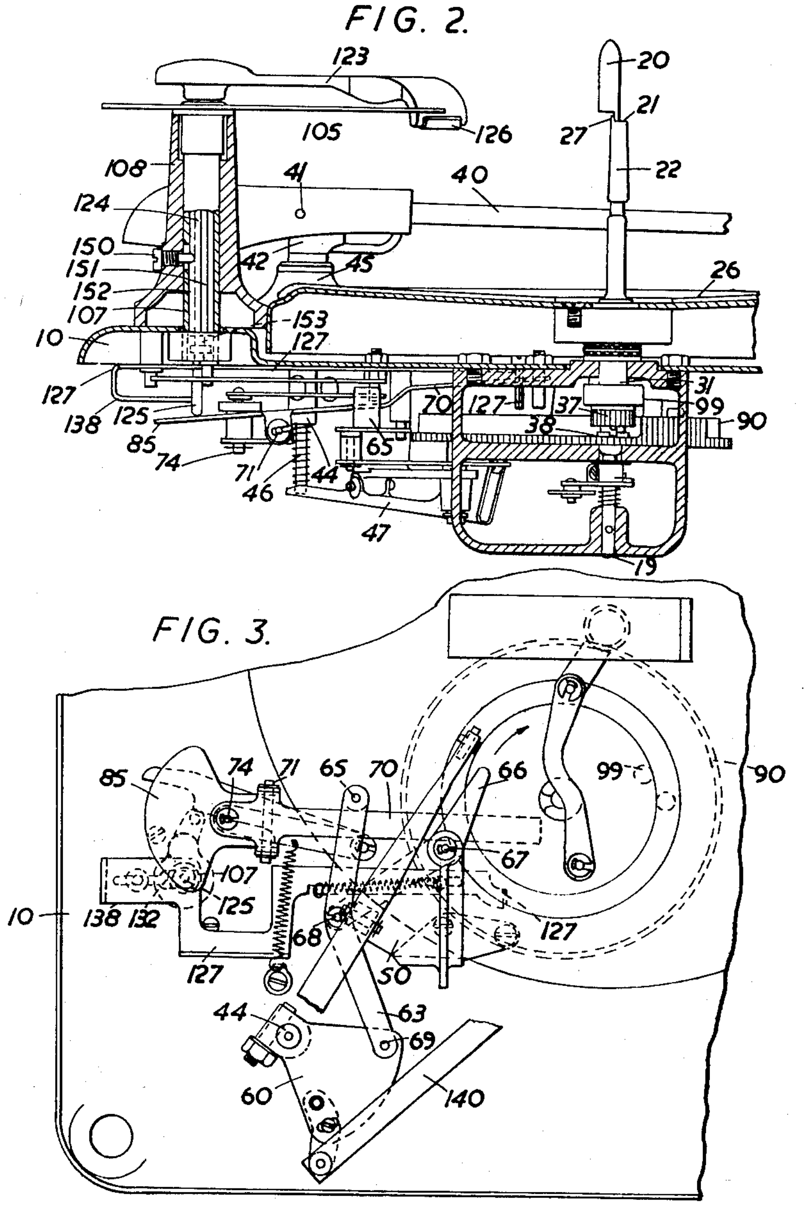

In order that the invention may be clearly understood and readily carried into effect, the same will now be more fully described with reference to the accompanying drawings, in which:

Figure 1 shows in plan a portion of a record changing mechanism embodying the invention, Figure 2 shows in sectional elevation said portion of said mechanism, and Figure 3 shows an underneath view of said portion of said mechanism.

The record changing mechanism illustrated comprises a base plate 10 on which is rotatably mounted a turntable 26 which surrounds a stationary record post 19 formed with an off-set portion 20 providing a shoulder 21 on which a pile of records is adapted to rest and be supported above the turntable 26. An additional support for the pile of records is provided in the form of a platform 105 mounted above base plate 10. An angularly adjustable sleeve 22 surrounds post 19 and carries thereon a record releasing member 27. A reproducer arm 40, supporting at its forward end (not shown), a suitable pickup or other reproducer, is rotatably mounted on a member 42 for vertical movement about a pivot 41. Member 42 is carried by a vertical hollow shaft 44 which passes through a short supporting pillar 45 and through the base plate 10, said shaft being rotatable to permit the reproducer and reproducer arm 40 to undergo horizontal movements. A lifting rod 46 passes through shaft 44 and its lower end engages one end of a pivoted lever 47 which is adapted to raise and lower rod 46 and cause that rod to raise and lower the reproducer and reproducer arm 40. A sector plate 60, which is secured to the lower end of the reproducer arm shaft 44 is connected at 64 to one end of a lever 63 and this lever is connected at an intermediate point 68 to one end of a further lever 66 pivotally mounted intermediate its ends for angular movement about a stationary pivot 67 carried by a platform 50 supported from the base plate 10. Referring to Figure 3, lever 66 is adapted to be rotated anti-clockwise about pivot 67 to cause lever 63 to move downwardly and rotate sector plate 60 clockwise, this movement being transmitted to shaft 44 and reproducer arm 40 so that arm 40 and the reproducer are adapted to be swung outwardly to a rest position in which it is shown in Figure 1. Lever 63 is adapted, when actuated, to reverse these movements so that the reproducer is moved inwardly to a point above the edge of a record on turntable 26. A member 70 is adapted to engage a projection 65 on lever 63 to actuate that lever, and member 70 is mounted for rotation about a vertical pivot 74 so that it can, when rotated anti-clockwise, engage projection 65 and displace lever 63, upwardly in Figure 3, to cause the reproducer to be moved inwardly. Member 70 is also mounted for rotation about a horizontal pivot 71 and means, to be referred to more fully hereinafter, are provided for permitting member 70 to move vertically from the position shown in Figure 2, in which it is ineffective to displace lever 63 and cause the reproducer to be swung inwardly, to a lower position in which it can be moved to engage projection 65 and displace said lever 63.

Driving means for the apparatus comprises a motor driven wheel (not shown) which engages the flanged rim of turntable 26 and the hollow turntable shaft 31, which rotates with the turntable, is adapted to be coupled through the elements 37, 38 of a clutch to a control disc 90 which co-ordinates and controls in known manner movements of the record releasing sleeve 22, movements of lever 47 which causes the reproducer to be raised and lowered, movements of lever 66 which causes the reproducer to be moved outwardly and movements of member 70 which causes the reproducer to be moved inwardly to a predetermined position above the edge of a record on the turntable 26.

Sector plate 60 on reproducer shaft 44 is coupled to control means (not shown), associated with the clutch 37, 38 by a link, a portion of which is indicated by the reference 140, such means being provided to enable the reproducer to actuate clutch 37, 38 in known manner at the end of playing of a record to thereby cause control disc 90 to become coupled to and driven by the turntable and the record changing mechanism to carry out a record changing cycle.

The reproducer arm 40 when lowered in the outward position in which it is shown in Figure 1 is arranged to move into engagement with a rest (not shown), which is associated, in known manner, with a switch controlling the driving motor of the mechanism, such that the reproducer arm holds the switch open while on the rest and permits the switch to close automatically as soon as the arm is moved out of engagement with the rest. A control (not shown), is also provided which is adapted when operated to raise the reproducer arm off the rest, to thereby permit the motor switch to close and start the driving motor, and to actuate the clutch 37, 38 so that the automatic mechanism will then release a record and swing the reproducer inwardly and lower it onto the record.

The record changing mechanism described hereinbefore is provided with a record steadying member comprising an arm 123 that is supported above record supporting platform 105 on the upper end of a shaft 124 that carries at its lower end a short co-axial rod 125. Arm 123 is rigidly secured to shaft 124 and said shaft passes through an aperture in platform 105 and through hollow shaft 107 on which latter member it is mounted for both angular and axial movements. Rod 125 projects through the lower end of hollow shaft 107. The pillar 108 which supports platform 105 and steadying member 123, is situated on the base 10 immediately above the outer fan shaped end 85 of member 70 and rod 125 lies above said fan shaped end 85 in all positions of member 70. Rod 125, when shaft 124 is moved to its lowermost axial position, is adapted to engage end 85 of member 70 and rotate that member anti-clockwise about horizontal pivot 71, to the position in which it is shown in Figure 2. When member 70 is held by rod 125 in this vertical position the automatic mechanism is rendered ineffective to move the reproducer inwardly because the inner end of member 70, which projects over the control disc 90, has been raised above the path of movement of a projection 99 on the control disc which forms the actuating means that is adapted to engage and displace member 70 about its vertical pivot 74 to cause it to displace lever 63 and sector plate 60 and swing the reproducer and reproducer arm 40 inwardly. When steadying member 123 is raised from the position shown in Figure 2, shaft 124 and rod 125 are displaced upwardly, rod 125 becomes disengaged from member 70 and that member rotates clockwise through a small angle, under the action of gravity, such that its inner end is lowered into the path of movement of projection 99 and the automatic mechanism becomes effective to move the reproducer inwardly during automatic cycles of the mechanism.

The steadying member 123 is provided with a turned down rubber covered end portion 126 which is adapted to engage the top record of a pile of records supported by record post 19 and platform 105 so that the weight of member 123, of shaft 124 and of rod 125 is borne by the pile. Member 123 is shown in Figure 2 in a predetermined lower position such that it causes the automatic mechanism to be ineffective to move the reproducer inwardly. In this position its turned down end 126 projects below the level of platform 105 and shoulder 21 and it is necessary to raise member 123 to a higher level to enable it to engage and steady a pile of records supported by platform 105 and shoulder 21.

In the angular position of member 123 in which it is adapted to steady a pile of records it projects over the turntable 26 towards record post 19, as shown by dotted lines in Figure 1 and it is angularly movable transversely of the turntable to the full line position at the side of the turntable in which it is shown in that figure, to permit records to be loaded onto and removed from the apparatus. Means are provided for positively locating member 123 in both these angular positions, said means comprising a guide pin 150 carried by pillar 108 and co-operating longitudinal grooves 151 and 152 formed in the surface of shaft 124. Grooves 151 and 152 are spaced apart angularly such that guide pin 150 engages in groove 151 when member 123 is in the record steadying position and in groove 152 when member 123 is in the away position at the side of the turntable. The lower ends of grooves 151 and 152 communicate with each other through an inter-connecting circumferential groove 153 which may extend beyond one or both longitudinal grooves or, as in the present case, extend completely round shaft 124. Guide pin 150 cooperates with grooves 151 and 152 to positively locate steadying member 123 in either of its angular positions and it is necessary to raise member 123 to a level above a pile of records on the mechanism in order to raise the inter-connecting groove 153 up to the level of guide pin 150 and thereby permit member 123 to be angularly displaced from one position to the other. Groove 153 in association with pin 150 determines the upper limit of axial movement of shaft 124 and in order to locate pin in groove 153 for the purpose of displacing member 123 from one angular position to the other all that is necessary is to raise member 123 as far as it will go. Steadying member 123 when moved to the away position at the side of the turntable will descend by gravity to the predetermined lower position in which it causes rod 125 to engage and rotate member 70 to the vertical position in which the automatic mechanism is rendered ineffective to move the reproducer inwardly. When member 123 is raised to its highest level and displaced angularly to the record steadying position it will again descend by gravity to said lower level and render the automatic mechanism ineffective to move the reproducer inwardly unless it is prevented from moving to said lower level by a record or a pile of records carried by platform 105 and record post 19. When, during operation of the record changing mechanism, a record is released from the underside of the pile and the remainder of the pile descends onto platform 105 and shoulder 21 of post 19 steadying member 123 follows this movement and when the last record of the pile is released member 123 can descend to the predetermined lower position in which it renders the automatic mechanism ineffective to move the reproducer arm inwardly. In order that descent of member 123 after release of the last record shall not prevent the reproducer from being moved inwardly for the purpose of playing said last record a delaying member 127 is provided comprising a sliding arm secured to the underside of base plate 10. Delaying member 127 is provided with a slot 132 through which rod 125 can pass and with a lower portion 138 which, normally, lies below rod 125 and above the fan-shaped portion 72 of member 70 so that it arrests descent of rod 125 and delays the final downward movement of that member to the predetermined lower position until the next succeeding automatic cycle of the record changing mechanism, which occurs at the end of playing of said last record. During each automatic cycle of the mechanism a reciprocating movement is imparted to delaying member 127, by means on control disc 90, which causes the lower portion 138 thereof to move from beneath rod 125 for an instant and thereby permits rod 125 to descend during said next succeeding cycle and render the mechanism ineffective to move the reproducer inwardly.

When the apparatus is at rest the reproducer arm will be in its outward position on the rest with the weight thereof holding the motor switch open and the steadying member will usually be in its away position at the side of the turntable and in its lower axial position where it renders the automatic mechanism ineffective to move the reproducer inwardly. If it is desired to operate the apparatus manually a record may be placed on the turntable and the reproducer raised and moved inwardly into engagement with the record by hand. Raising the reproducer will cause the motor switch to close and the electric motor which drives the turntable to be energised but clutch 37, 38 is not closed so that the automatic mechanism is not brought into operation. The reproducer may be handled freely both at the commencement of playing of the record or after playing has started and the apparatus may be brought to rest at any time by raising the reproducer manually, moving it outwardly and lowering it so that reproducer arm 40 engages the rest. If, however, the operator permits the reproducer to reach the end of the sound track on the record, the reproducer arm will then cause the clutch control means to be operated through shaft 107, sector plate 60 and link 140 and clutch elements 37, 38 will close and couple control disc 90 to the turntable shaft 31. The automatic mechanism will then operate to raise and move the reproducer outwardly and to lower the reproducer arm 40 onto the rest, so that the apparatus will be brought to a standstill.

For automatic operation of the record changing mechanism one or a pile of records may be loaded onto platform 105 and shoulder 21 of post 19. The steadying member 123 is then raised to its highest position, moved transversely of the turntable to the steadying position above the turntable and lowered onto the record or the topmost record of the pile.

The starting control may now be actuated to cause the reproducer arm to rise, the motor switch to close and energise the motor and the clutch control means to operate to close clutch elements 37, 38 and couple control disc 90 to turntable shaft 107. The control disc will then actuate sleeve 22 and cause a record to be released and, since steadying member 123 is now held by the record or records above the predetermined lower level at which it causes the mechanism to be ineffective to move the reproducer inwardly, the control disc will also cause the reproducer to be moved inwardly and lowered into engagement with the released record. Thereafter the apparatus will play the record on the turntable and will release and play automatically in sequence all the records carried by platform 105 and post 19. After release of the last record member 123 descends until rod 125 comes into engagement with portion 138 of delaying member 127 and, during the automatic cycle which occurs after playing of the last record, delaying member 127 is actuated to release rod 125 so that member 123 again descends to the predetermined lower position in which it causes the automatic mechanism to be ineffective to move the reproducer inwardly. The mechanism therefore does not move the reproducer inwardly during this cycle but lowers it in the outward position onto its rest and thereby causes the apparatus to be brought to rest.

The purpose of extending circumferential groove 159 beyond one or both longitudinal grooves 151, 152 in shaft 124 is to enable steadying member 123 to be moved, if desired, to another angular position away from the turntable in which it cannot descend to the predetermined lower level in which it partially disables the automatic mechanism. Instead of extending groove 153 another circumferential groove may be provided for this purpose.

What I claim is:

1. A record changing mechanism for phonographs, comprising a pick-up, a turntable, a record post for supporting a pile of records above the turntable, automatic means for feeding the records singly to the turntable, said automatic means including means for raising and lowering the pick-up, means for moving the pick-up outwardly and a member displaceable along a circular path for moving the pick-up inwardly, a record steadying arm, a vertical shaft carrying said arm, a support mounting said shaft for rotatable movement between positions in which said arm can steady said pile and an away position, said support also mounting said shaft for axial movement between a lowermost position in which said steadying arm lies below the position of the pile of records and a raised position in which said steadying arm can rest on and steady the pile of records, a further member, and means mounting said further member for rotation about two axes at right angles, said further member projecting into the path of said first-mentioned member to be displaced by said first-mentioned member about one of said axes to move the pick-up arm inwardly and said further member being also disposed to be engaged and displaced about the other of said axes by axial movement of said shaft to said lowermost position to move said further member out of the path of said first-mentioned member and render said first-mentioned member ineffective to move the pick-up inwardly.

2. A record changing mechanism according to claim 1, comprising means for preventing axial displacement of said shaft in angular positions of said record steadying arm intermediate the record steadying and the away positions of said arm, said means including means for preventing angular displacement of said record steadying arm in positions other than a predetermined raised position of said shaft.

References Cited in the file of this patent

UNITED STATES PATENTS

| | | |
|---|---|---|
| 2,529,438 | Wennerbo | Nov. 7, 1950 |
| 2,541,072 | Jones | Feb. 13, 1951 |
| 2,545,643 | Bender | Mar. 20, 1951 |
| 2,637,558 | Fisher | May 5, 1953 |

FOREIGN PATENTS

| | | |
|---|---|---|
| 235,600 | Switzerland | June 1, 1945 |
| 118,769 | Sweden | May 6, 1947 |
| 631,064 | Great Britain | Oct. 26, 1949 |